United States Patent [19]
Hsu

[11] Patent Number: 5,341,439
[45] Date of Patent: Aug. 23, 1994

[54] SYSTEM FOR TEXTURE-BASED AUTOMATIC DETECTION OF MAN-MADE OBJECTS IN REPRESENTATIONS OF SENSED NATURAL ENVIRONMENTAL SCENES

[76] Inventor: Shin-Yi Hsu, 2312 Hemlock La., Vestal, N.Y. 13850

[21] Appl. No.: 934,094

[22] Filed: Aug. 21, 1992

Related U.S. Application Data

[63] Continuation-in-part of Ser. No. 729,139, Apr. 6, 1992, Pat. No. 5,274,715, which is a continuation-in-part of Ser. No. 410,218, Sep. 21, 1989, abandoned.

[51] Int. Cl.$^5$ .......................... G06K 9/52; G06K 9/54
[52] U.S. Cl. .......................................... 382/28; 382/49
[58] Field of Search .................... 382/1, 19, 28, 27, 49; 358/107, 108, 109; 395/130; 348/135, 143, 144

[56] References Cited

U.S. PATENT DOCUMENTS

| | | | |
|---|---|---|---|
| 4,229,797 | 10/1980 | Ledley | 382/28 |
| 4,617,682 | 10/1986 | Mori et al. | 382/28 |
| 4,839,807 | 6/1987 | Doi et al. | 382/6 |
| 4,897,881 | 1/1990 | Ledinh | 382/28 |
| 4,908,703 | 3/1990 | Jensen et al. | 358/106 |
| 5,029,225 | 7/1991 | Ueda | 382/28 |
| 5,040,225 | 8/1991 | Gouge | 382/28 |
| 5,224,175 | 6/1993 | Gouge et al. | 382/28 |

OTHER PUBLICATIONS

Haralick et al "Textural Features for Image Classification" IEEE Trans SMC vol.-SMC 3, No. 6, Nov. 1973, pp. 610-621.
Sanz, "Computing Image Textures in Parallel Computers" Proceedings of IEEE, vol. 76 No. 3, Mar. 1988, pp. 292-294.
Lumia et al "Texture Analysis of Aerial Photographs" Pattern Recognition Society, 1983 pp. 39-45.

Primary Examiner—Joseph Mancuso
Assistant Examiner—David Fox
Attorney, Agent, or Firm—Martin LuKacher

[57] ABSTRACT

A system for texture-based automatic detection of man-made objects or targets or features of scenes (automatic target recognition, ATR or detection, ATD) in representations of sensed natural environmental scenes spatially partitions digitized picture elements (pixels) of the scene into plural spatially coordinated groups of pixels and simultaneously determines texture measures including a composite texture measure for each group of pixels. Following self-calibration of the spatially coordinated composite texture measure values along spatially delineated row and orthogonal column directions of groups of pixels, areas of interest (AOIs) are identified as the groups of pixels most likely to contain a man-made object, target or feature in a decision logic which performs a group of statistical tests. Automatic detection of the spatial location of a man-made object, target, or feature within each AOI occurs by a single-threshold segmentation of pixels associated with each AOI into a grouping of target pixels and a grouping of non-target pixels. The spatial location of the man-made object, target, or feature within each AOI can be visually displayed, and the target location coordinates within the entire scene reported, whereupon the automatic detection system is reset for sensing and processing of a subsequent scene.

23 Claims, 8 Drawing Sheets

FIG.8

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 1.00 | 1.00 | 1.00 | 1.00 | 1.00 | 1.00 | 1.00 | 1.00 | 1.00 | 1.00 | 1.00 | 1.00 | 1.00 | 1.00 |
| 2 | 1.00 | 1.00 | 1.00 | 1.00 | 1.00 | 1.00 | 1.00 | 1.00 | 1.00 | 1.00 | 1.00 | 0.83 | 1.00 | 0.80 |
| 3 | 1.00 | 1.00 | 1.00 | 0.87 | 1.00 | 1.50 | 1.00 | 1.00 | 1.00 | 1.50 | 1.00 | 1.00 | 1.50 | 1.00 |
| 4 | 1.00 | 1.00 | 1.33 | 1.00 | 1.00 | 1.00 | 1.00 | 1.00 | 1.00 | 1.00 | 0.57 | 0.67 | 1.00 | 1.00 |
| 5 | 1.00 | 1.10 | 1.14 | 1.43 | 1.00 | 1.00 | 1.00 | 1.25 | 1.50 | 1.50 | 0.67 | 1.00 | 1.00 | 0.86 |
| 6 | 1.00 | 1.20 | 1.09 | 1.09 | 0.92 | 0.70 | 0.88 | 1.00 | 1.25 | 1.00 | 1.20 | 1.40 | 1.00 | 0.67 |
| 7 | 1.00 | 1.24 | 1.05 | 0.81 | 2.00 | 2.29 | 0.59 | 0.44 | 1.14 | 1.29 | 1.50 | 1.33 | 0.75 | 0.67 |
| 8 | 1.00 | 1.52 | 1.38 | 0.86 | 1.65 | 1.66 | 0.42 | 0.35 | 0.83 | 1.09 | 1.30 | 1.00 | 0.77 | 0.94 |
| 9 | 1.00 | 1.61 | 1.72 | 1.00 | 1.10 | 1.07 | 0.65 | 0.73 | 0.95 | 0.95 | 1.00 | 0.80 | 1.00 | 0.83 |
| 10 | 1.00 | 1.27 | 1.20 | 1.11 | 1.39 | 1.05 | 0.76 | 0.79 | 1.00 | 1.09 | 1.27 | 1.21 | 1.00 | 0.85 |
| 11 | 1.00 | 1.38 | 1.50 | 1.27 | 1.17 | 0.79 | 0.50 | 0.65 | 1.26 | 1.30 | 1.64 | 1.50 | 0.97 | 0.94 |
| 12 | 1.00 | 1.00 | 1.00 | 1.00 | 1.00 | 1.00 | 1.00 | 0.55 | 1.71 | 1.65 | 1.25 | 1.18 | 1.03 | 1.08 |
| 13 | 1.00 | 1.00 | 1.00 | 1.00 | 1.00 | 1.00 | 1.00 | 1.00 | 1.00 | 2.33 | 0.92 | 0.86 | 2.00 | 2.00 |
| | 1.00 | 1.00 | 1.00 | 1.00 | 1.00 | 1.00 | 1.00 | 1.00 | 1.00 | 1.00 | 1.00 | 1.00 | 1.00 | 1.00 |

ROW SELF-CALIBRATED COMPOSITE TEXTURE MEASURE VALUES — 20

GRID CELL ROW# (LONGITUDINAL DIRECTION)
GRID CELL COLUMN# (LATITUDINAL DIRECTION)

FIG. 9

COLUMN SELF-CALIBRATED COMPOSITE TEXTURE MEASURE VALUES

SKY? (rows 1–4) • TREES? (rows 5–6) • GROUND? (rows 7–13)

| Row \ Col | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 1.00 | 1.00 | 1.00 | 1.00 | 1.00 | 1.00 | 1.00 | 1.00 | 1.00 | 1.00 | 1.00 | 1.00 | 1.00 | 1.00 |
| 2 | 0.50 | 0.50 | 0.50 | 0.50 | 0.60 | 0.60 | 0.60 | 0.75 | 0.75 | 0.50 | 0.50 | 0.60 | 0.75 | 0.75 |
| 3 | 0.33 | 0.33 | 0.33 | 0.40 | 0.40 | 0.60 | 0.40 | 0.50 | 0.75 | 0.50 | 0.50 | 0.40 | 0.50 | 0.50 |
| 4 | 1.00 | 1.33 | 1.33 | 2.00 | 1.33 | 1.33 | 1.33 | 1.67 | 1.67 | 1.67 | 3.00 | 2.33 | 2.00 | 2.00 |
| 5 | 3.50 | 3.50 | 4.00 | 5.00 | 4.00 | 3.50 | 3.50 | 3.50 | 2.67 | 3.00 | 6.00 | 6.00 | 4.50 | 4.00 |
| 6 | 3.33 | 3.67 | 3.00 | 3.00 | 2.75 | 2.75 | 3.00 | 2.20 | 2.00 | 2.40 | 2.17 | 1.71 | 1.67 | 1.33 |
| 7 | 3.00 | 3.71 | 2.75 | 2.10 | 5.50 | 6.86 | 3.71 | 3.00 | 2.38 | 2.22 | 1.50 | 1.33 | 2.00 | 1.88 |
| 8 | 2.90 | 4.00 | 3.33 | 3.17 | 6.00 | 5.73 | 2.33 | 2.00 | 2.20 | 2.00 | 2.15 | 2.42 | 2.80 | 3.00 |
| 9 | 0.86 | 1.12 | 1.41 | 1.38 | 0.77 | 0.65 | 0.85 | 0.95 | 1.16 | 1.30 | 2.00 | 2.44 | 1.94 | 2.20 |
| 10 | 0.52 | 0.43 | 0.45 | 0.55 | 0.38 | 0.35 | 0.68 | 0.77 | 1.09 | 1.17 | 1.07 | 1.14 | 1.11 | 1.29 |
| 11 | 0.44 | 0.38 | 0.39 | 0.48 | 0.41 | 0.35 | 0.32 | 0.30 | 0.55 | 0.54 | 0.31 | 0.31 | 0.31 | 0.39 |
| 12 | 0.07 | 0.05 | 0.06 | 0.05 | 0.04 | 0.04 | 0.05 | 0.06 | 0.06 | 0.04 | 0.03 | 0.03 | 0.06 | 0.06 |
| 13 | 0.13 | 0.09 | 0.08 | 0.07 | 0.07 | 0.09 | 0.09 | 0.17 | 0.08 | 0.07 | 0.09 | 0.08 | 0.09 | 0.08 |

GRID CELL ROW # (LONGITUDINAL DIRECTION) → ; GRID CELL COLUMN # (LATITUDINAL DIRECTION) →

SYSTEM FOR TEXTURE-BASED AUTOMATIC DETECTION OF MAN-MADE OBJECTS IN REPRESENTATIONS OF SENSED NATURAL ENVIRONMENTAL SCENES

RELATED APPLICATIONS

This application is a continuation-in-part of application Ser. No. 07/729,139, filed Apr. 6, 1992, U.S. Pat. No. 5,274,715, which is a continuation-in-part of application Ser. No. 410,218, filed Sep. 21, 1989, now abandoned.

FIELD OF THE INVENTION

The present invention relates to object or target or feature detection systems (methods and apparatus) and more particularly to systems for texture-based automatic detection (automatic target recognition, ATR or detection, ATD) of man-made objects or targets or features in representations of sensed natural environmental scenes. More generally, the invention relates the image processing and analysis, particularly where the texture of the image, and more particularly, differences in the texture in various segments of the image, are used to characterize the image.

BACKGROUND

In remote sensing applications of natural environmental scenes containing man-made objects or targets, the difficulty and complexity of identifying not only the presence of targets but also their location within the scene increases rapidly as the distance increases between the sensing member and the scene. Remote sensing from satellites, providing a downward-looking view of environmental scenes, and forward looking views taken at relatively low angle of depression with respect to the plane of the environmental scene from relatively great distances are two examples of remote sensing applications of natural environmental scenes wherein the confidence level of locating a man-made object or target within the scene decreases as the cross-sectional area of the object decreases relative to the total area of the scene subtended by the remote sensing member. Accordingly, it would be desirable to provide a method and system capable of extracting during subsequent examinations of representations of such scenes the locations of man-made objects with a higher level of confidence than available heretofore.

In instances requiring the determination of the location of man-made objects or targets within a natural environmental scene in as short a period of time as possible after remote sensing of the scene, i.e., as close to real-time location determination as possible, the system used for such relatively rapid extraction of information on object location must not only provide object location determination with a high level of confidence but must be capable of reaching that determination rapidly. The importance of near real-time determination of the location of man-made objects in natural environmental scenes can be envisioned by a remote sensor's ability to rapidly zoom its optical system for an additional, enlarged view of the object or objects shortly after the initial or first view has provided the location of such object or objects within the scene.

Another aspect of remote sensing, i.e., sensing of scenes relatively distant from the sensing member, is the range of levels of brightness or levels of contrast within the scene as perceived by the sensing member within the spectral region of response of the sensing member. For example, a sensing member with a forward-looking view toward a natural environmental scene comprising a section of sky above, a section of trees in the center and a section of ground land below will perceive within its spectral region of response different levels of brightness and contrast emanating from the respective sky, tree, and ground sections at an instant in time. If the same scene were to be viewed by the same sensing member at another time, for example, in winter versus summer, or in dawn versus high noon, the differences of the different brightness and contrast levels associated with the respective sky, tree and ground sections can be smaller or larger than the respective brightness and contrast levels during the earlier scene sensing. Likewise, different spectral regions of response of the sensing member or members will render differing brightness levels or contrast levels among the sky, tree and grass sections. A scene viewed by a sensing member responsive only to near-infrared radiation in the spectral region of wavelengths from about 700 nm to about 900 nm will give a scene representation in terms of brightness levels and contrast ranges quite different from the same scene viewed by a sensing member responsive only to green-yellow light in the spectral region of wavelengths from about 520 nm to about 620 nm. Accordingly, it would be advantageous to employ a method and system capable of extracting information about the location of man-made objects or targets in natural environmental scenes viewed under differing conditions of scene brightness and contrast levels, or viewed within differing spectral ranges of response of the sensing member or of sensing members.

A number of sensing members and sensing systems have been proposed. Generally, sensing members responsive to radiation emanating only from the scene to be viewed or sensed are referred to as passive sensors. Sensing members responsive to signals emitted toward the scene by an emitter and reflected by the scene and partially collected by the sensing member are referred to as active sensors. Radar equipment and other microwave systems, and laser-based systems, can be considered to have active sensors which respond to some fraction of the signal emitted by part of the system and partially reflected toward the sensor by elements or regions of the scene. Among passive sensors or sensing systems are photographic materials, such as photographic films of black-and-white or color-rendering capacity. Scenes captured or stored on photographic materials are generally thought of as being two-dimensional photographic representations of the scene and are considered to contain scene information in analog form provided by the nature of the photographic process. Such photographic scene representations lend themselves to detailed subsequent analysis of features by visual or microscope-aided inspection. Alternatively, the analog information of the photographic material can be transformed into digital information by various known digitizing techniques such as sequential line scanning, flying spot scanning, half-tone replication, rephotographing with a digital camera, and the like. The advantage of providing and storing scene digital information resides in the application of computer-aided digital signal processing to the task of feature identification, thereby facilitating a substantially automated approach to locating certain features contained within the scene.

Another, generally passive, class of sensing elements are so-called area array sensors, currently most prominently represented by silicon-based charge-coupled devices (CCDs). These sensors comprise a relatively large number (several thousand to several million) of individually addressable, closely adjacent radiation-sensitive domains (also called picture elements or pixels), with each domain capable of generating an electrical signal in response to levels of incident radiation, covering a wide range of signal levels, for example, 256 grey levels of signal. In such area arrays, the domains are spatially arranged in a series of parallel rows and also in a series of parallel columns orthogonal to the rows. Thus, a scene viewed by such an area array sensor will be read out in the form of signal levels associated with discrete and known spatial coordinates of the device. These signals can then be stored in known means for digital data storage, for example on magnetic tapes or disks, optical disks, or electronic devices referred to as frame storage memories.

In the context of automatic detection of man-made objects or targets or features contained within natural environmental scenes, several problems are faced, among these are:

(a) Due to remote sensing of the scene, targets may comprise dimensions of only a few tens of pixels out of possibly many thousands of pixels subtending the entire scene.

(b) The need for automatic detection with the computer-aided processing of digital signals and digital data to arrive at location-specific determination of a target or targets or features of interest within the scene.

(c) Near real-time determination of target location which requires relatively rapid processing of suitably derived digital data.

Various methods have been described for processing digital signals associated with, or derived from, pictorial information. For example, Doi, et al. in U.S. Pat. No. 4,839,807, issued Jun. 13, 1989, discuss the comparison of texture measures determined from digitized images of abnormal lungs with similar measures contained in a data base for normal lungs. A texture index is determined from normalized texture measures, and a threshold texture index is then chosen for initial selection of abnormal regions of interest of lung tissue having a large texture index above the threshold texture level. The selected abnormal regions are then further classified into categories of abnormality. Thus, the method and system of Doi et al for automated classification of distinction between normal lungs and abnormal lungs in digital chest radiographs requires a reference data base of texture measures for normal lungs.

Mori, et al. in U.S. Pat. No. 4,617,682, issued Oct. 14, 1986, discuss a method and apparatus for automatic quantitative measurement of textures by image analysis of a material having various optically anisotropic textures. The image is divided into a plurality of sections, and brightness of each section is classified by storage of grey levels of signals corresponding to these sections. Texture patterns are recognized on the basis of variations of grey levels, such variations being observed before and after movement of a mask. Textures of the material are then determined in accordance with predetermined criteria. Thus, Mori et al. employ an iterative process to determine texture and coarseness measures from grey level signals of areas of sample images which are prejudged to contain information suitable for image analysis.

In Ledinh, et al., U.S. Pat. No. 4,897,881, issued Jan. 30, 1990, is discussed a fast texture parameter extractor having parallel processing capability to obtain a texture parameter from any four picture pixels automatically selected in a rectangular pattern. Transformed signals from these four pixels are uncorrelated with respect to one another. While the Ledinh et al. feature extractor may provide real-time extraction of textural features due to parallel signal processing, the texture extraction is based upon the application of four two-dimensional masks, independent of the images, to four adjacent pixels of a video display image.

Ledley in U.S. Pat. No. 4,229,797, issued Oct. 21, 1980 describes a method and system for whole-picture image processing which provides for automatic texture and color analysis. The whole-picture analysis is performed relative to a predetermined whole reference picture.

SUMMARY OF THE INVENTION

In accordance with the present invention there is provided an improved system, (method and apparatus) for texture-based automatic detection of man-made objects or targets in representations of natural environmental scenes containing such objects or targets.

It is an object of the invention to provide an improved system which detects automatically the location of a man-made target or targets (the term target including an object or feature) within a natural environmental scene by generating simultaneously a plurality of spatially coordinated texture measure values indicative of a range of texture values for regions within the scene.

Another object of the invention is to provide an improved system for automatic detection of a target in a scene in the absence of a reference scene.

A further object of the invention is to provide an improved system for automatic detection of the target location by self-calibration of texture measure values within regions of the scene.

A still further object of the invention is to provide an improved system for automatic detection of the target location by self-calibration of spatially coordinated texture measures in accordance with ratios of texture measures among neighboring regions.

Another object of the invention is to provide an improved system for target detection which identifies by additional tests particular regions of the scene most likely to contain a target.

Still another object of the invention is to provide an improved system for target detection in which a display of the location coordinates of a man-made target is obtained by assignment of a visually distinct color to each of a number of ranges of texture measures within the scene.

Still another object of the invention is to provide an improved system for automatic location-specific detection of targets contained in natural environmental scenes viewed from relatively great distances, as from an earth-orbiting satellite.

Target detection, even for targets partially or fully hidden from visual view, in accordance with the invention, is based on the recognition that a target, particularly a man-made object, will appear as a discontinuity in a texture measure presentation of the natural environmental regions of the scene. In contrast, earlier approaches to target detection, based solely on evaluation of pixel-level greytone signals, have shown at best a correct target detection rate of 80 percent, coupled with an incidence of wrongly identified targets at the rate of 1.5 targets in a model scene. These results, derive to a large extent from the observation that pixel-level greytone signals of a target can, on average, be higher than, or similar to, or lower than greytone signals corresponding to natural environmental regions surrounding the target. Even relatively advanced algorithms, which had been designed specifically for feature extraction by such greytone signal processing, could not overcome the unpredictability or variability of signal levels associated with a target relative to signal levels associated with the natural environmental surrounding.

The present invention employs scene-based regional texture rather than individual pixel intensity values as the basis for target detection. The spatial distribution of texture patterns are analyzed to detect the existence of a target, which is regarded as a foreign object inserted into a natural and texturally relatively homogeneous environment. While the texture properties of the target and of the natural environmental surrounding may change with time, season, or spectral responsivity of the sensor, the differences between the texture of a target and the texture of the surrounding natural environment will remain significant, due to dissimilar materials and dissimilar structural properties.

In general, texture of a scene, image or object can be defined as the spatial variation or distribution of tonal or intensity values of picture elements, wherein the spatial variation extends over a given area. Spatial variations extending over areas comprising a region of a few picture elements can be considered as having a measure of micro-texture. If an entire scene, having possibly a few hundred thousand picture elements, is regarded as one region, the boundaries between larger features within that scene can be considered as a measure of macro-texture. The term "meso-texture" describes texture measures which are between micro-texture and macro-texture. A numerical value devised for, or assigned to, a texture measure is called a "texture index". When texture is expressed as "meso-texture", a "meso-texture index" is a relevant numerical value.

The present invention is useful for processing digital signals representative of a sensed or captured scene, with the digital signals being associated with spatial coordinates of the scene. Spatial coordinates may be expressed as degrees of longitude and latitude, or as the location of picture elements contained in each of a plurality of adjacent parallel rows and in each of a plurality of adjacent columns, where the columns are arranged orthogonally to the rows (i.e., in orthogonal x, y coordinates). A picture element located at the intersection of the first row and the first column (picture element [1;1]) can, for example, be related to geographical locations prevailing during the capture or the sensing of the scene.

After sensing the scene and providing digital signal representations of the sensed scene, automatic target detection proceeds from the stored digital signals by the following major steps, in accordance with the present invention:

(a) Partitioning the picture elements (pixels) representing the scene into a plurality of individual identical and spatially coordinated groups of pixels with each group containing an identical number of pixels, and storing the associated digital signals; and (b) Determining simultaneously from each one of all individual groups of pixels a plurality of digital data indicative of a texture measure or texture index of each group of pixels, and storing the spatially coordinated digital data.

In addition, the following steps can be used:

(c) Self-calibrating the stored texture measures by the ratio of texture measure values among neighboring groups of pixels along rows and columns, and storing the self-calibrated texture measure values;

(d) Deciding by the application of a group of statistical tests to the spatially coordinated self-calibrated texture measures the identity of the group or groups of pixels having high or highest texture measure values, thereby identifying a particular group or groups of pixels as an area or areas of interest (AOI), most likely to contain a target;

(e) Detecting automatically the presence of a target within an area or areas of interest;

(f) Displaying the spatial location coordinates of the target within the area of interest;

(g) Reporting the spatial location coordinates of the target; and (h) Resetting the automatic detection system for acceptance of a subsequent representation of a sensed scene.

One advantage of the present invention is that scene-based regional texture measures provide an enhanced capability to determine the location of a target within a natural environmental scene.

Another advantage of this invention is that the self-calibration feature of scene-based regional texture measures automatically generates the region or regions of high or highest-value texture measures as the regions likely to contain a man-made object or target.

A further advantage of the invention is that statistical tests among regional texture measures provide for the decision on designation of a region or of regions as areas of interest (AOI) within the scene most likely to contain a man-made object or target.

Still another advantage of the invention is the near real-time generation of the location of the AOI within the scene.

An additional advantage of the invention is that the location of the man-made object within the AOI can be determined by a one-pass segmentation step.

BRIEF DESCRIPTION OF THE DRAWINGS

The foregoing and other objects and advantages of the invention will become more readily apparent by reference to the following detailed description when considered in conjunction with the accompanying drawings, wherein:

FIG. 8 is a row-by-row rendering of an example of self-calibrated texture measure values of a sensed scene obtained with the system according to this invention;

FIG. 9 is a column-by-column rendering of an example of self-calibrated texture measure values of a sensed scene obtained with the system according to this invention.

DETAILED DESCRIPTION

Figure 1:
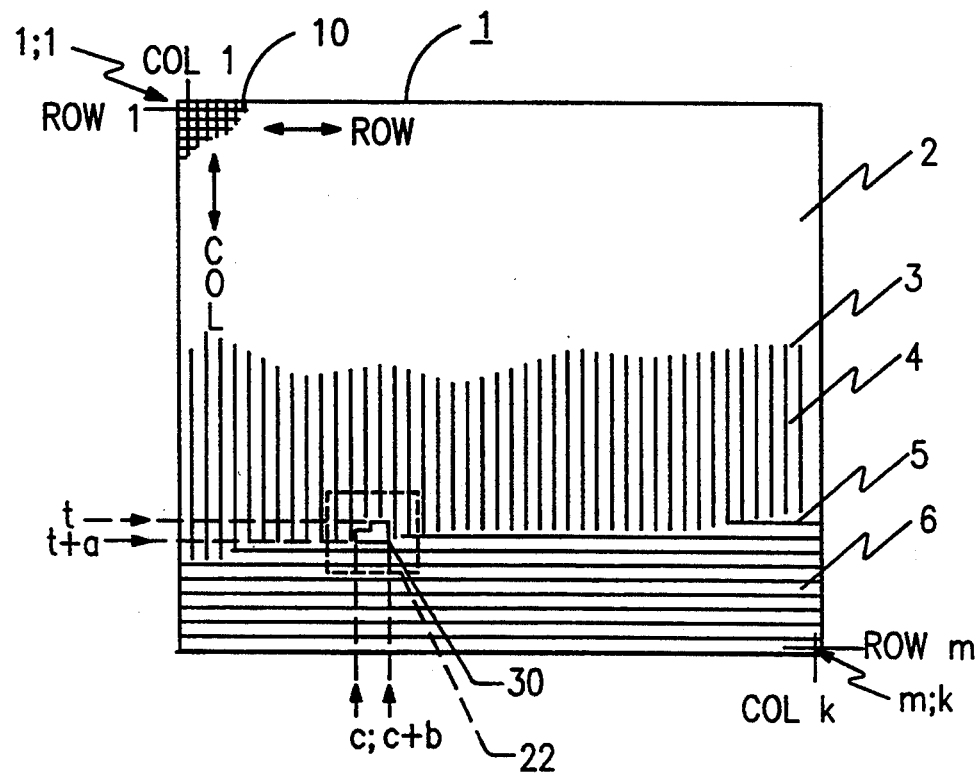
FIG. 1 is a schematic representation of a natural environmental scene displayed on a video monitor from spatially coordinated digital signals, and including an area of interest (AOI) containing a man-made target.

FIG. 1 depicts a video display 1 of a natural environmental scene composed of a sky zone 2, a sky/tree interface zone 3, a tree zone 4, a tree/ground interface zone 5 and a ground zone 6. Video display 1 is representative of digital signal levels associated with picture elements (pixels) 10 arranged along rows and orthogonal columns in the sensing element used to capture the scene. Spatial coordinates of the scene, or of regions or areas within the scene, are provided by the location of pixels within the display 1. For example, the spatial coordinates of the first picture element in the upper left corner are given as (1;1) by its location in the first row and in the first column. Likewise, a picture element in the lower right corner has spatial coordinates (m;k) due to its location in row m and column k.

Display 1 also shows an area of interest (AOI) 22 surrounding in dotted outline a man-made target 30 with spatial coordinates (r and r+a; c and c+b). The area of interest (AOI) contains a selected number of p picture elements in a square-shaped grid cell with spatial coordinates parallel to the rows and columns of picture elements and thus expressible in the same coordinate terms as the pixels.

Both the AOI location, and the detection of the target location within the AOI, are the main objectives of the present invention. In the absence of a detection method, the area of interest 22 and the target 30 within it would, of course, not be known when first sensing or recording the natural environmental scenes. Thus, FIG. 1 represents the results obtained by the invention, rather than a direct and immediate observation of the location of a target within a just-captured natural environmental scene.

Video display 1 can be the display of a singular view of a scene, or it can be one of many frames of a relatively distant scene sensed by a remote video camera which rotates about its axis to capture slightly overlapping images throughout a 360 degree circle of view, each image or frame subtending an optical angle of view of, for example, 10 degrees. The key objectives of the invention are the automatic determination which, if any, of these multiple frames or views contains a target and the determination of the location of such target with an acceptable level of confidence and within a time period approaching real-time detection.

Figure 2:
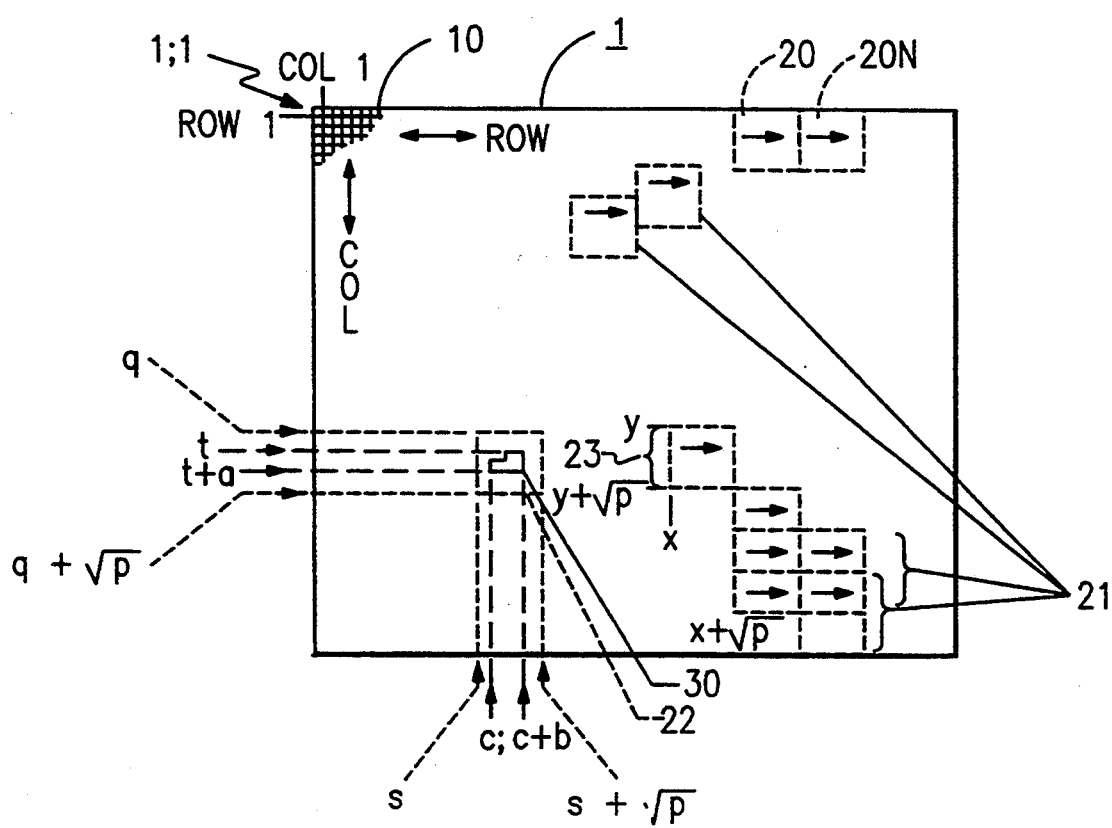
FIG. 2 is an illustration of scanning overlapping grid cell regions of picture elements according to this invention.

FIG. 2 shows elements of the video display 1 of FIG. 1 with natural environmental zones 2 through 6 deleted for clarity. Area of interest region 22 has been assigned spatial coordinates (q and q+$\sqrt{p}$; s and s+$\sqrt{p}$), reflective of the square-shaped AOI grid cell containing p picture elements. As pointed out in discussion of FIG. 1, neither the AOI nor the target would in reality be recognizable in the scene as initially sensed and stored.

A grid cell 20, containing or subtending p picture elements (like the AOI) is scanned along a straight path across the scene, for example, from the upper left corner to the upper right corner of display 1 in FIG. 2, as indicated by the arrow within grid cell 20. After an inactive retracing interval, grid cell 20 scans again from left to right in a straight line with an overlap to the previous grid cell scan. The overlapping feature of successive grid cell scans is indicated schematically by grid cells 21, each overlap representing a single grid cell 20 scanning over portion of the band of grid cells previously scanned. The spatial coordinates of a grid cell anywhere within the display 1 are given for one grid cell 23 as (y and y+$\sqrt{p}$; x and x+$\sqrt{p}$).

During the scan, the scanning grid cell is the conceptual vehicle by which the digital signal levels of each one of a group of p picture elements are "read" from a whole-scene digital signal storage means. These grid cell based digital signals are then designated for grid cell texture measure determination.

The "size" selection of grid cell 20 is governed by several considerations. Firstly, the size, i.e., the number of pixels contained within it, is selected to be approximately an even fraction of all scene pixels within a row and within a column. For example, if the total scene contained 1,000 pixels in each row and 1,000 pixels in each column ($10^6$ pixels total), a grid cell could subtend 100×100 pixels ($10^4$ pixels total), thereby partitioning the total scene into 100 adjoining regions in the absence of grid cell overlap. Some commercially available sensing devices have different aspect ratios or formats regarding number of pixels per row and numbers per column. For example, the scene captured by a typical near-infrared sensor has 896 picture elements in each row and 832 picture elements in each column. A useful grid-cell size for digital data from this sensor would be 64×64 pixels, resulting in 14 grid cell columns arranged along the row direction and 13 grid cell rows arranged along the column direction in the absence of overlap among grid cells.

The grid cell size selection is also influenced by one objective of the invention, namely to achieve designation of areas of interest (most likely to contain a target) within the scene by generating regional texture measures. Two extreme examples amplify the need for compromise in selecting the grid cell size:

(a) If the grid cell size is chosen to be the size of the entire scene, there would be but one whole-scene composite texture measure or texture index. While no scanning of grid cells would be required in this case, a target comprising only a few pixels in size within that scene would most likely not be detected. Boundaries between large features (macro-texture) and pixel-to-pixel variations (micro-texture) as well as intermediate textural features (meso-texture) would all contribute in fraction to that composite texture index.

(b) Alternatively, if the grid cell size is chosen to be the size of an individual picture element, the present invention could not be implemented, since scene-based regional texture measures could not be developed at all with pixel-sized "regions." The latter case would be reduced to pixel-based grey-level signal processing for feature extraction, with its attendant disadvantages.

Thus, it is evident that the grid cell size should be chosen such that automatic target detection with a high level of confidence can be achieved through regional texture measures in accordance with the present invention. A preferred range of the number of non-overlapping grid cell regions (pixel groups) per full scene is from 50–300 identical regions per scene. Ten regions per scene are considered a minimum number of regions for scenes sensed by sensors with relatively few picture elements.

The spatial overlap among successive groups of pixels (extracted digital signals) can range from zero (adjoining or abutting groups of pixels) to 75 percent spatial overlap. Preferably, the spatial overlap is in the range from 1–50 percent of the grid cell or pixel group size. In general, it has been found that within the preferred range of spatial overlap, scanning artifacts and attendant noise levels are minimized compared to zero overlap signal extraction, thereby effectively enhancing the detectability of targets which have only moderately higher texture measure values (texture indices) than surrounding texture measure values.

Figure 3:
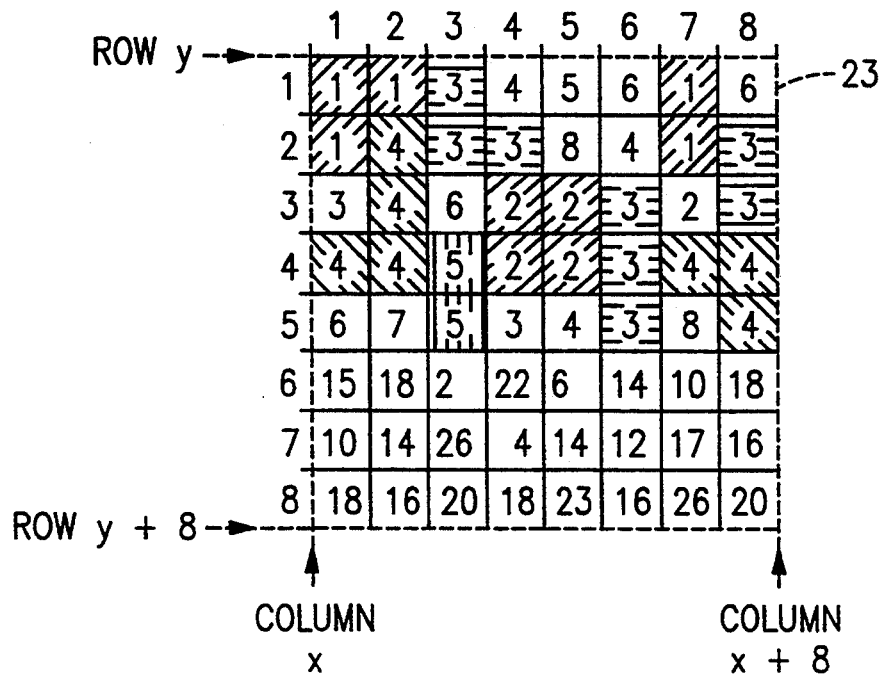
FIG. 3 is a schematic representation of partially merged individual picture element signal levels within a grid cell region at one threshold according to this invention.

FIG. 3 shows an example of a group of 64 picture elements arranged in eight rows and in eight orthogonal columns, and contained within a grid cell 23. The 8×8 arrangement is shown for clarity of presentation, rather than to suggest that an 8×8 pixel group is a preferred pixel group size. Numerical values assigned at the inside of each pixel denote each pixel's digital signal resulting from capturing or sensing the region of the scene subtended by dotted grid cell outline 23. Within this spatial arrangement of the group 64 pixels, the signal levels vary, ranging from values of 1 to values of 26.

The variously shaded sub-regions within the pixel group subtended by grid cell 23 are intended to demonstrate the effect of merging all nearest neighbor pixels having zero difference between their respective signal levels in the presence of a threshold level of 0.0 for such differences. Thus, two sub-groups of nearest neighbor pixels having digital signal levels of 1 and 4, respectively, are shown as merged; three sub-groups of pixels with signal levels of 3 are merged, and one sub-group of nearest neighbor pixels with signal levels of 2 and 5, respectively, appear as merged pixels at the threshold=0.0 condition applicable to FIG. 3 as a signal level difference determinant.

Thus, FIG. 3 illustrates sub-regions of merged pixels, merged in accordance with a condition of a threshold level 0.0 for differences among signal levels of nearest neighbor pixels. A total number $n_0 = 38$ unmerged pixels are shown remaining after this threshold process, equivalent to about 59% of the original 64 picture elements. Stated differently, the total number of sub-regions within the grid cell region 23 is now the sum of the remaining 38 unmerged single pixel sub-regions and the merged pixel sub-region.

Figure 4:
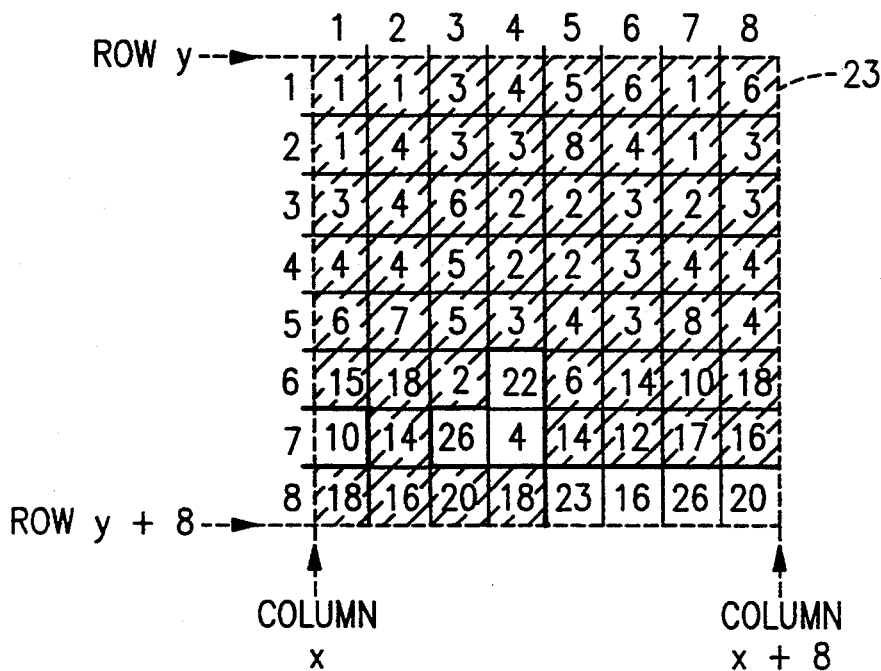
FIG. 4 is a schematic representation of partially merged individual picture element signal levels within a grid cell region at another threshold according to this invention.

In FIG. 4 is shown the same grid cell region 23 with identical pixel signal levels as in FIG. 3, but with a threshold setting of 3.0 for signal level differences among nearest neighbor pixels. Under this threshold condition most pixels appear merged, as indicated by simple shading of the merged pixels. Only a total number $n_3 = 8$ unmerged picture elements remain after this threshold process, equivalent to about 12.5% of the original 64 pixels. Stated differently, the total number of sub-regions is now nine, equal to the sum of eight remaining unmerged single pixel sub-regions and one merged pixel sub-region.

FIGS. 3 and 4 are illustrative examples only to demonstrate the merging of nearest neighbor picture elements whose digital signal level differences are at or below a threshold value for such signal level differences. Resulting numbers, such as $n_0$ (threshold=0.0) and $n_3$ (threshold=3.0) of remaining unmerged picture elements form the basis for computing grid cell based regional texture measures, as described below. As pointed out earlier, automatic target detection according to the invention has as its main objective to provide to a human observer only the final result, namely the location coordinates of a target within a natural environmental scene. Intermediate results, such as those shown in FIGS. 3 and 4 will not be accessible for display in an automatic target detection system, since such display to a human observer would invoke the observer's judgement and thereby obviate the automatic capability of the system.

Figure 5:
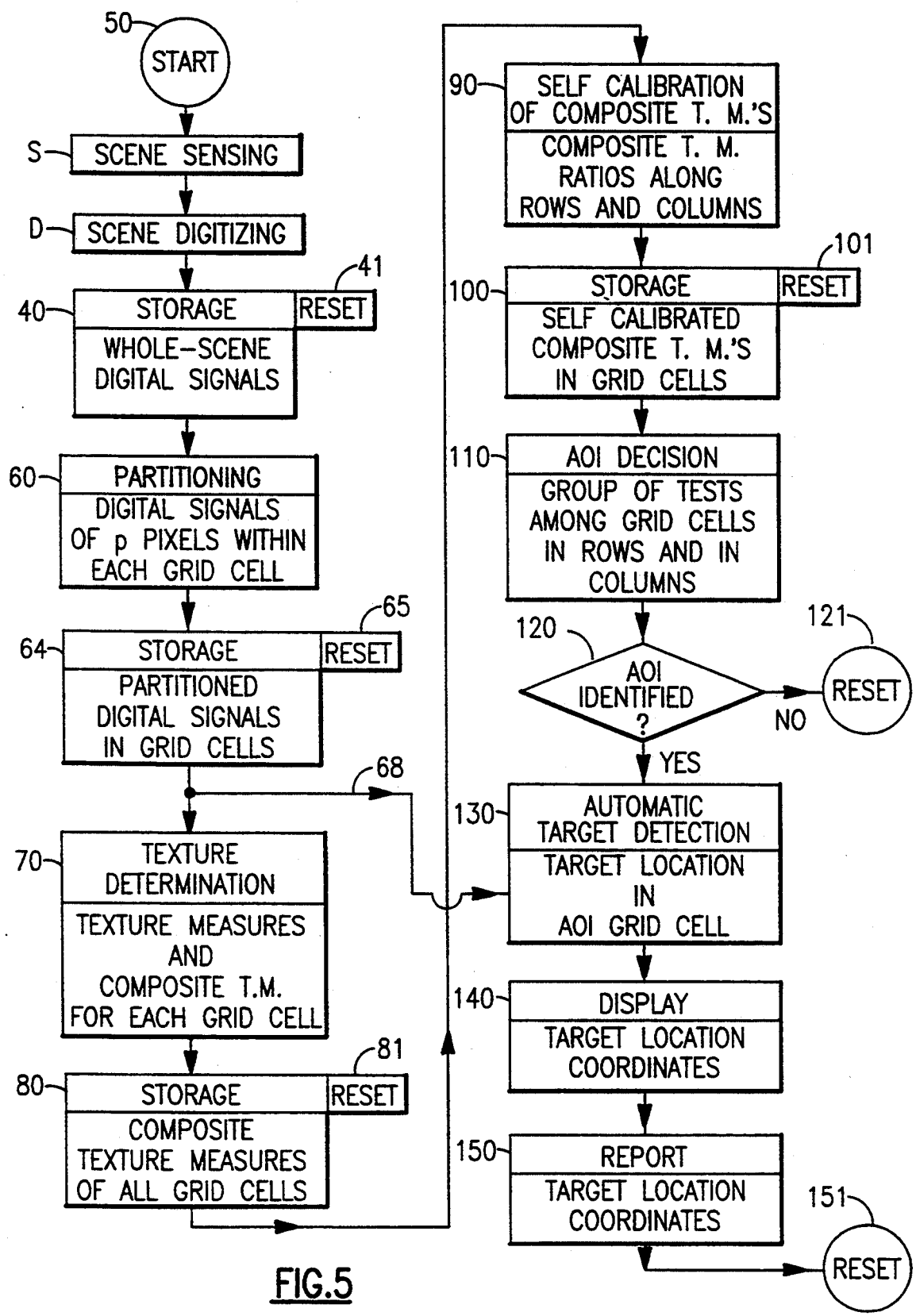
FIG. 5 is a block diagram of the flow chart of the automatic target detection, or ATR, system according to this invention.

Referring now to FIG. 5, upon activating start command 50, scene sensing means S senses a scene or a frame. As discussed above, scene sensing means S can be a video camera which either directly captures a scene or a frame through its associated optical system with prescribed geographical coordinates or markers, or which for example, re-captures an existing analog image, such as a photographic image, of a scene. In the event that scene sensing means S provides at its output digital signals directly, these digital signals are stored in storage means (computer memory) 40. In the event that sensing means S provides a non-digital output, a scene digitizing means (analog-to-digital converter) D is used to digitize that non-digital output. Thus, whether or not a digitizing means D is needed depends on the type of sensing member S deployed in the automatic detection system. Storage means 40 can be any suitable means for accepting and storing whole-scene digital signals. Preferred storage means 40 are electronic storage means, also referred to as electronic mass memories or electronic frame storage devices. The storage capacity of storage means 40 must be sufficient to store in a spatially coordinated manner digital signals representing all picture elements of the scene and a sufficient range of signal levels assigned to each picture element to ensure a faithful reproduction of the scene's features and tonal values if the natural environmental scene were to be compared with a display of digital signals stored in storage means 40 and derived from the same scene.

For remote sensing applications, and particularly when a sequence of differing scenes is to be subjected to automatic target detection in a near real-time manner, the preferred electronic storage means 40 need only have storage capacity sufficient to store one scene or frame for the length of time required to achieve automatic target detection, or approximately the same length of time to achieve the decision that a target is not likely to be detected. After either of these automatic outcomes, electronic storage means 40 can be reset or cleared by a reset means, or input 41 to prepare storage means 40 for acceptance and storage of digital signals associated with a subsequent scene or frame.

Digital signals are transferred from, or read out from, storage means 40 into partitioning means 60 which partitions the digital data of the scene into a fixed number plurality of spatially coordinated groups of pixels by selection of grid cell regions or segments, in accordance with considerations discussed in conjunction with the descriptions of FIGS. 2–4. The size of grid cells, i.e., number of pixels contained in each group of pixels, is predetermined and remains invariant so long as one and the same number of picture elements are representative of the scene or frame. Partitioning means 60 forwards to storage means 64 the spatially coordinated group of pixels or grid cells. The preferred storage means 64 is an electronic storage means, for example, an electronic mass memory or electronic frame storage device with comparable features to storage means 40 described above. Storage means 64 can be reset or cleared by a reset means 65 in preparation for accepting and storing partitioned digital signals associated with a subsequent scene or frame. Texture determination means 70 reads out from storage means 64 one spatially coordinated group of pixels, or one grid cell's worth of pixels, at a time for texture measure determination. Texture determination means 70 may be implemented by a routine of the program which implements the system and is shown in FIG. 5. It is described in more detail in conjunction with FIG. 6, where the storage means 64 is indicated in dashed outline as providing to texture determination means 70 digital signals associated with spatially coordinated groups of p pixels subtended by, or contained within, each grid cell.

Figure 6:
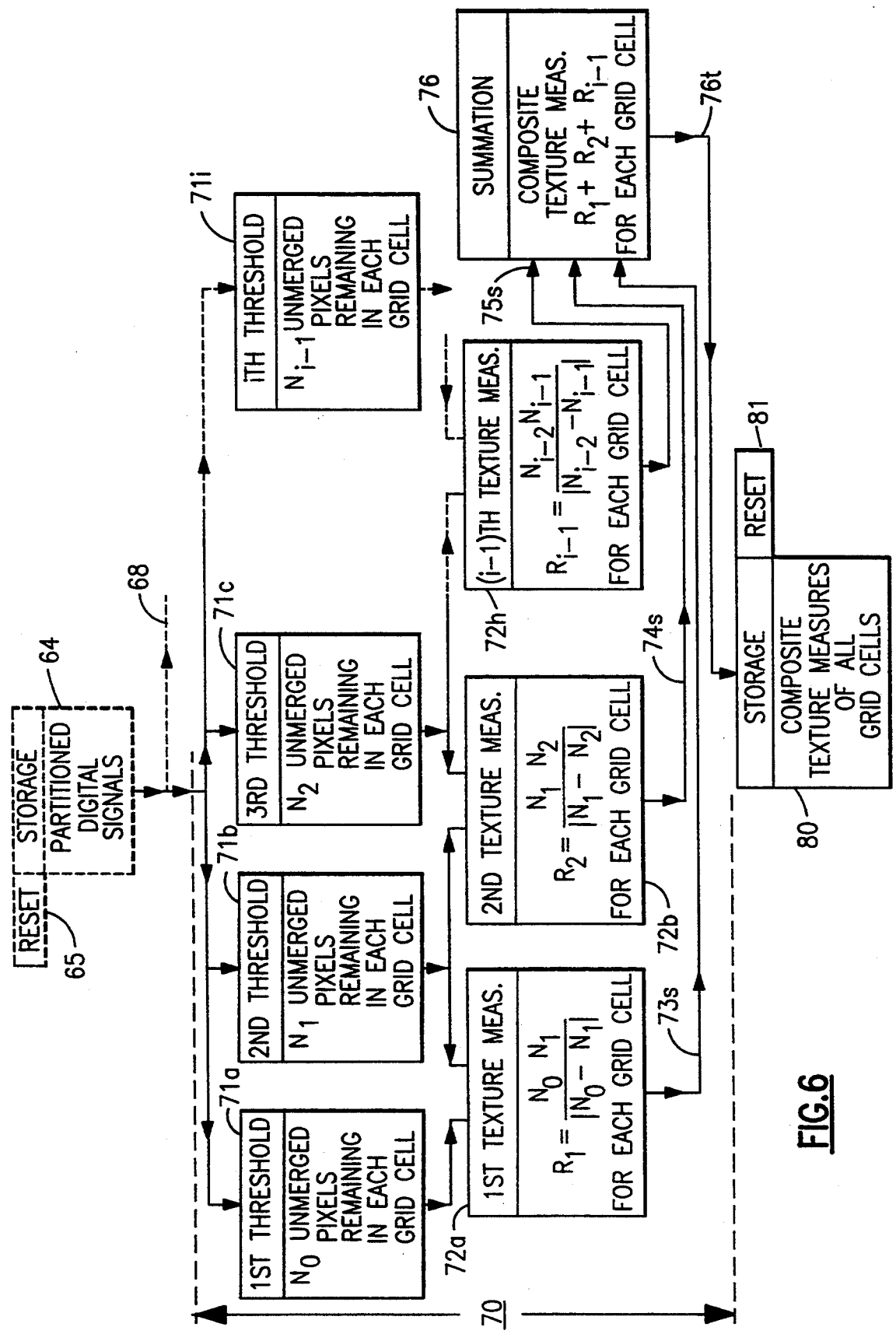
FIG. 6 is a more detailed block diagram of the texture measure determination sub-system according to this invention.

Referring now to the upper section of texture determination means 70 in FIG. 6, there is shown thresholding processes which may be carried out in a parallel arrangement of microprocessors 71a, 71b, 71c through 71i, each processor simultaneously receiving digital signals associated with the pixels contained within each grid cell from partitioning means 60, one grid cell at a time. The thresholding process in each of the parallel microprocessors is dedicated to a singular threshold level, such as a first, second, third, etc. threshold, wherein a threshold level is the upper limit of the difference of digital signal levels between nearest neighbor pixels within the group of pixels defined by the grid cell. The threshold levels increase by linear increments from the 1-st threshold to the i-th threshold. The intended effect of each of these linearly increasing threshold levels is to merge simultaneously all nearest neighbor pixels at each threshold condition and thereby to determine both, the remaining number n of unmerged pixels and sub-regions being formed by the merged pixels for each threshold level. These simultaneously determined remaining numbers of sub-regions $n_o$, $n_2$, through $n_{i-1}$, are used subsequently to determine the texture measures according to the invention. Merging of nearest neighbor pixels within a grid cell, and resultant numbers of remaining unmerged pixels and of newly-formed merged pixel sub-regions at each of two different threshold level conditions was discussed above in conjunction with FIGS. 3 and 4.

Anticipating a substantial range of pixel signal values and a substantial range of pixel-to-pixel signal differences (a measure of pixel-to-pixel contrast) in natural environmental scenes which may contain targets, the number of threshold levels and, therefore, the number of parallel microprocessors, is selected so as to ensure a merging of all but the most highly contrasting pixels or groups of pixels within a grid cell. It has been found that ten parallel microprocessors, each processor having a fixed threshold level differing incrementally from the threshold levels of the other microprocessors, can generate the numbers $n_o$ to $n_9$, and subsequently from these numbers the associated texture measures and further measures to result in automatic target detection in many environmental scenes. A preferred number of parallel microprocessors 71a through 71i is i=20, thereby providing twenty differing threshold levels for determining twenty numbers, $n_o$ to $n_{19}$, for subsequent texture measure or texture index determination and finally automatic target detection in virtually all anticipated natural environmental scenes.

Microprocessors 71a through 71i preferably operate at a so-called clock frequency in the range from about 30–50 MHz to facilitate a relatively rapid determination of the numbers $n_o$ to $n_{i-1}$, for each grid cell comprising the scene.

In the lower section of texture determination means (routine) 70 of FIG. 6 implements a multiplicity of texture measurement processes, in an assembly of microprocessors 72a, 72b through 72h, each of these processors also operating at a clock frequency ranging from 30–50 MHz. Microprocessor 72a is dedicated to determination of a first texture measure $R_1$ for the group of pixels within each grid cell, wherein $$R_1 = \frac{n_0 \, n_1}{|n_0 - n_1|},$$

i.e., the product of the number of segmented sub-regions after first and second thresholds, respectively, divided by the absolute value of the difference between these respective numbers of segmented sub-regions. Likewise, microprocessor 72b is the determination means for generating a second texture measure $$R_2 = \frac{n_1 \, n_2}{|n_1 - n_2|}$$

for the group of pixels within each grid cell. Similarly, microprocessor 72h generates the texture measure $R_{i-1}$ from the numbers of $n_{i-2}$ and $n_{i-1}$ of the segmented sub-regions after the (i−1) and i-th thresholds, respectively.

Texture measures or texture indices $R_1$, $R_2$, through $R_{i-1}$ are determined for pixels within one and the same grid cell simultaneously, then for the next grid cell group of pixels, etc., until all texture measures for all groups of pixels within their respective grid cells have been generated.

Microprocessor 72a is depicted with an output 73s for texture measure $R_1$. Likewise, processor 72b has output 74s for texture measure $R_2$, and microprocessor 72h is shown with output 75s for texture measure $R_{i-1}$. Outputs 73s, 74s and 75s are fed to a summation means or process 76 wherein one composite texture measure or composite texture index G for all pixels within a grid cell is generated as the linear sum of the texture measures $R_1$, $R_2$, through $R_{i-1}$ for that grid cell. Summation means 76 is also a microprocessor operating at about 30–50 MHz.

Composite texture measure output 76t connects to storage means 80 where all composite texture measure data, of all spatially coordinated grid cells are stored for subsequent processing. Storage means 80 is preferably an electronic storage means having sufficient storage capacity for all digital data reflective of the composite texture measures and having the capacity to accept, store the data, and from which such data are read out at a data rate matching the data flow rate of the other processors of the automatic target detection system. Dynamic random access memory devices (dRAMs) are preferred storage means. A reset means 81 is associated with storage means 80, so that storage means 80 can be cleared to be ready to accept texture measure digital data associated with a subsequent scene.

Thus, texture determination means 70 generates from digital signal levels of pixels within a group of pixels (contained in a spatially coordinated grid cell) regional or grid cell-based texture measures and one composite texture measure by the simultaneous application of incrementally different threshold levels, and by simultaneous generation of all texture measures from the respective number of pixels remaining beyond each of the threshold levels.

Table 1 is a numerical print-out example of texture measure data and the composite texture measure obtained for pixels contained in one grid cell by texture determination means 70, using an arrangement of parallel processors for setting threshold conditions. The grid cell in this example contained $64 \times 64 = 4096$ picture elements or pixels.

TABLE 1

| Threshold Condition (a) | Number of Segmented Sub-regions (n) | Product $(n_a n_{a+1})$ | Difference $\lvert n_a - n_{a+1} \rvert$ | Texture Measure R |
|---|---|---|---|---|
| 0 | 2737 | — | — | — |
| 1 | 1550 | 4,242,350 | 1187 | 3574 |
| 2 | 885 | 1,371,750 | 665 | 2062 |
| 3 | 503 | 445,155 | 382 | 1165 |
| 4 | 283 | 142,349 | 220 | 647 |
| 5 | 162 | 45,846 | 121 | 378 |
| 6 | 94 | 15,228 | 68 | 223 |
| 7 | 60 | 5,640 | 34 | 165 |
| 8 | 34 | 2,040 | 26 | 78 |
| 9 | 22 | 748 | 12 | 62 |
| 10 | 17 | 374 | 5 | 74 |
| 11 | 13 | 221 | 4 | 55 |

SUM: 8453
(SUM of texture measures R = composite texture measure G)

It appears from the results in Table 1 that for the pixel group within the grid cell of the example, the addition of a few more threshold levels via associated dedicated microprocessors would have been beneficial to generate additional texture measures for the last-remaining thirteen segmented sub-regions.

Figure 7:
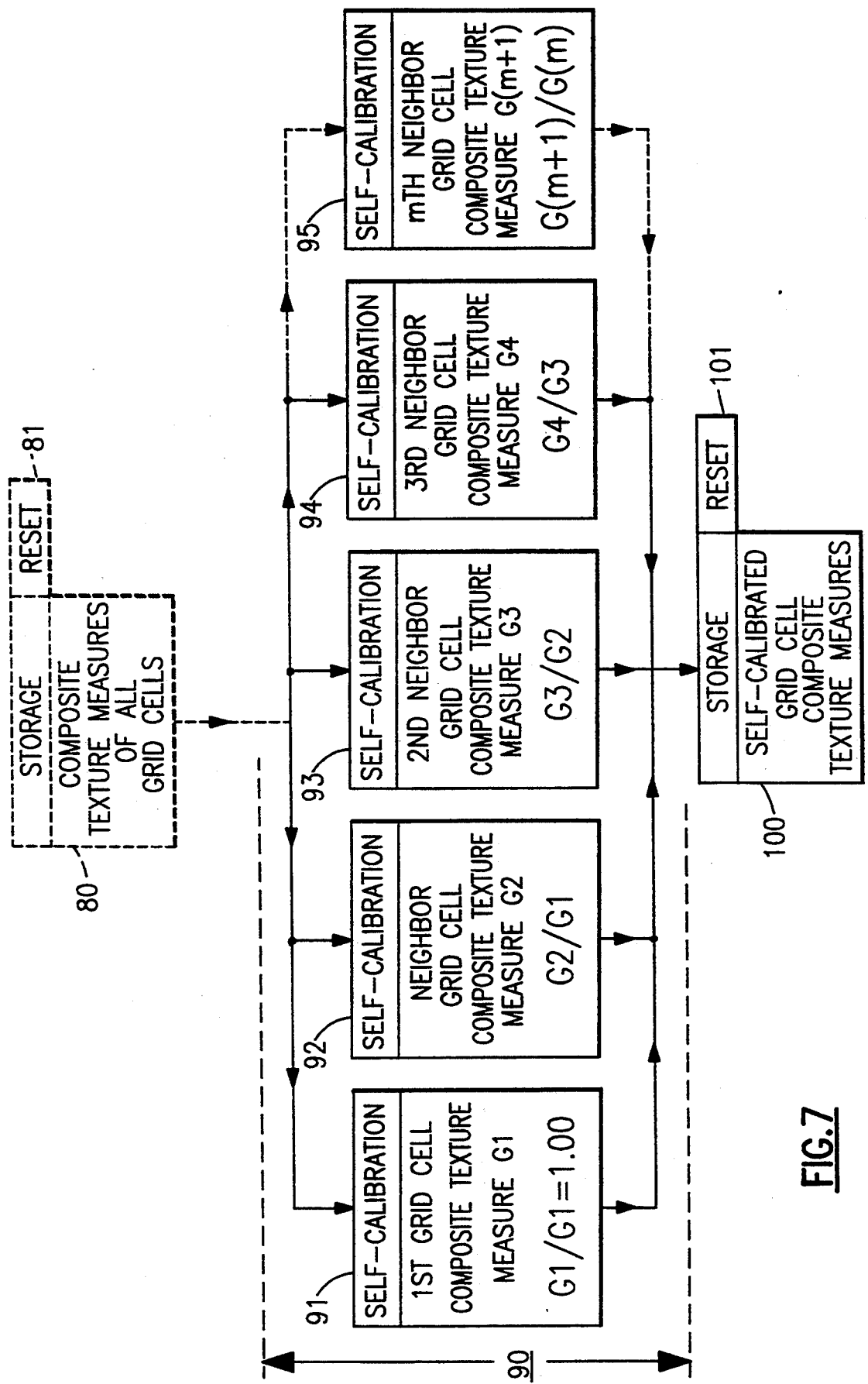
FIG. 7 is a more detailed block diagram of the self-calibration sub-system according to this invention.

Referring now to FIGS. 5 and 7, there is shown a self-calibration routine or means 90 receiving grid cell-based digital composite texture measure data from storage means 80, shown in dashed outline in FIG. 7. Self-calibration occurs by forming the ratio of composite texture measures among composite texture measures of neighboring spatially coordinated grid cells, or groups of pixels. One grid cell, for example grid cell 20 in FIG. 2, is selected as the first grid cell of a row or column of grid cells and is assigned a self-calibration value of 1.00 by the ratio of its own composite texture measure G1/G1, where G1 is indicated in FIG. 7 as the composite texture measure of the first grid cell in a row or column. Self-calibration of the first grid cell is achieved by the process carried out in a microprocessor 91 in FIG. 7. The composite texture measure G2 of a neighboring grid cell in the same row or column, for example of grid cell 20N in FIG. 2, is then related to the self-calibration value of 1.00 of the first grid cell in that row or column by the ratio G2/G1, in microprocessor 92 of FIG. 7. Next, a 2nd neighbor grid cell in the same row or column with composite texture measure G3 is related to the previous grid cell (G2) by the ratio G3/G2 in processor 93. The self-calibration is continued until the last grid cell composite texture measure G (m+1) has been related to the composite texture measure G (m) of the preceding grid cell in each row or column by the ratio G (m+1)/G (m) in microprocessor 95.

FIG. 7 indicates five parallel microprocessors 91 through 95 as part of self-calibration means 90, for purposes of clarity of presentation of the self-calibration steps. In practice, one microprocessor may adequately perform self-calibration of composite texture measures by the ratio of composite texture measures among neighboring grid cells, since the grid cell based digital data stored in storage means 80 can be transferred to self-calibration means 90 in a sequence that relates the spatial coordinates and thus the identification of each grid cell with its time of transfer.

Self-calibrated grid cell-based composite texture measure values are stored in a storage means 100 with associated reset means 101. Storage means 100 is preferably an electronic memory of the dynamic random access memory type.

Self-calibration of grid cell-based composite texture measures can be performed by self-calibration means 90 first for all neighboring grid cells located in each of a number of rows of grid cells, for example, fourteen grid cells positioned in spatial coordination in each of thirteen rows of grid cells, followed by self-calibration of the grid cell composite texture measures for the neighboring grid cells located in each of a number of columns of grid cells, for example, thirteen grid cells positioned in spatial coordination in each of fourteen columns of grid cells, where columns are oriented orthogonally to rows. Self-calibration can be performed in the reverse order. In either case, the former scene or frame will now be represented by grid cell-based regions, for example, an arrangement of $14 \times 13 = 182$ grid cells having self-calibrated composite texture measure values along both the row and column directions, or in a mapping sense along the latitudinal and longitudinal directions. The first grid cell of each row and of each column of grid cells has a self-calibrated composite texture measure value of 1.00.

Self-calibration of composite texture measures among groups of pixels subtended by grid cells can also be performed by selecting grid cells located in every second row or column to be referenced by the ratio formation against texture measures of grid cells located in rows and columns preceding these second grid cells by two grid cell spaces. Accordingly, self-calibration of composite texture measure values can occur by the ratio formation between successive and preceding first-neighbor grid cells or between successive and preceding second-neighbor grid cells.

Although the system for automatic target detection according to the present invention does not require the displaying of the grid cell-based self-calibration composite texture measure values stored in storage means 100 of FIGS. 5 and 7, the visualization of these self-calibration composite texture measure values can be helpful in clarifying the need for further steps and means to achieve automatic self-detection of a target in a natural environmental scene. Accordingly, FIGS. 8 and 9 are included to prevent a grid cell-based print-out of self-calibrated composite texture measure values of a natural environmental scene 1 (similar to the scene depicted in FIG. 1) as stored in storage means 100. Grid cells 20 in FIGS. 8 and 9 are shown in dotted outline, and correspond approximately to the same grid cell location in FIG. 2.

FIG. 8 provides latitudinal self-calibrated composite texture measure values for each grid cell, wherein the term latitudinal refers to self calibration along each row of grid cells. Consequently, all grid cells located in the first column have a self-calibrated composite texture measure value of 1.00. All other values were derived by the ratio formation between successive and preceding second-neighbor grid cells.

FIG. 9 provides longitudinal self-calibrated composite texture measure values for each grid cell, wherein the term longitudinal refers to self-calibration along each column of grid cells. Consequently, all grid cells located in the first row have a self-calibrated composite texture measure value of 1.00. All other values were derived by the ratio formation between successive and preceding second-neighbor grid cells.

From the presentation of self-calibrated composite texture measures of one and the same scene in FIGS. 8 and 9, a human observer might reach several conclusions:

(a) Since the heavily dotted grid cell outlines in FIGS. 8 and 9 represent clusters of grid cells with high or highest self-calibrated composite texture measure values, i.e., clusters of regions of high or highest regional contrast compared to neighboring grid cell regions, a target is most likely contained within these regions;

(b) since there appears to be some degree of coincidence between the cluster of highest composite texture grid cells in row 7, columns 5 and 6, of FIG. 8 and the cluster of high composite texture grid cells in row 7, columns 5 and 6, of FIG. 9, the man-made object is most likely contained in these two grid cells;

(c) the man-made object or target could be relatively large because it covers two grid cell columns;

(d) the target could be relatively small and is located at the boundary between grid cells, i.e., in row 7 between columns 5 and 6;

(e) several targets may be contained within these two grid cells;

(f) at least in FIG. 9, the self-calibrated composite texture measure values along rows appear to suggest groupings which could be interpreted as a sky zone, a tree zone and a ground zone, similar to the scene in FIG. 1; and (g) due to reasoning in (f) the target or targets are located between the assumed tree zone and the assumed ground zone.

The present invention has the capability to detect or self-detect the target location automatically (ATR). Thus, automatic target detection requires one or several decision rules, by which an area of interest (AOI) grid cell can be identified from among the grid cells having high or highest self-calibrated composite texture measure values. This decision of identification is accomplished by subjecting the self-calibrated grid cell based composite texture measures stored in storage means 100 to a group of several statistical tests in AOI decision means 110. AOI decision means 110 is preferably a computing means having routines which perform a group of tests, and identifying by these tests the AOI or AOIs as areas most likely to contain a target or targets. The routines or tests are as follows:

(1) rank ordering, by magnitude, the self-calibrated composite texture measure values G of grid cells (groups of pixels), with a selected cut-off number K for the number of grid cells remaining in the rank order;

(2) linear correlation among self-calibrated composite texture measure values between a fraction of each row and a fraction of each column of grid cells having a remaining rank order grid cell within that fraction and an identical fraction of neighbor row or column of grid cells having no remaining rank order grid cells, with an upper cut-off value selected to indicate relatively high correlation above that value, and a lower cut-off value chosen on indicate relatively poor correlation below this value; and (3) sum-of-squares of slope difference between a slope A and a slope B, where slope A is the difference of self-calibrated composite texture measure values between a ranked grid cell and an unranked grid cell neighbor A to one side of the ranked grid cell, divided by a unit cell spacing; and where slope B is defined like slope A, except that the unranked grid cell neighbor is located to the other side of the ranked grid cell.

These statistical tests relate to texture regions of a scene in the following ways:

(1a) rank ordering of grid cells by the value of the self-calibrated composite texture measures identifies by rank and location those grid cells which have highest or high textural contrast or relatively coarse texture with respect to surrounding grid cells (groups of pixels), the latter exhibiting relatively finer texture reflective of the natural environmental features;

(2a) linear correlation among self-calibrated composite texture measure values between grid cells located in neighboring rows and neighboring columns can be appreciated by envisioning first that a man-made object or target is not present in either pair of rows or pair of columns. In that case the correlation between self-calibrated composite texture measures in grid cells of two neighboring rows or columns is relatively high, for example, 0.9, with a correlation of 1.0 being perfect correlation. One can predict that a target does not exist in either one of the two rows or columns. However, if one of the two rows or one of the two columns contains a target in one grid cell, the correlation between a neighboring row or column and a target row or column would be poorer or lower (than in the absence of the target), for example, 0.4;

(3a) The slope difference, expressed as the sum of the squares, is another determinant of regional, grid cell-based contrast, which helps to distinguish between grid cells of relatively high self-calibrated composite texture value located in a surround of grid cells with relatively low self-calibrated composite texture value, and grid cells of relatively high self-calibrated composite texture value located in a surround of grid cells also having moderate to high values of self-calibrated composite texture measures.

From experimental results with thirty-six test scenes, each scene containing a single man-made object in a natural environment, a test model of an automatic target detection system according to the present invention detected a singular area of interest (AOI) from among clustered grid cells (as shown in FIGS. 8 and 9) by subjecting clustered grid cells to the group of the three statistical tests described above with AOI decision means 110 of FIG. 5.

AOI decision means 110 is configured to provide a decision on the result of each of the statistical tests in the group of tests, and to provide a summary or final decision about the presence and location or locations of an AOI grid cell or AOI grid cells. The decisions on each of the individual statistical tests are based on assigning numerical values to the test results. For example, the rank ordering test results can be presented as numbers 1, 2, 3 through K. Likewise, the results of the correlation test can be presented as numerical values, weighted between the upper and lower cut-off values of that test. Similarly, the results of the slope difference test can be presented by numerical values. The summary or final decision on identifying which one, if any, of the self-calibrated composite texture measure grid cells or groups of pixels are AOI grid cells, can be, for example, the linear sum or a weighted sum of the numerical values indicative of the results of the individual statistical tests in the group of tests. Thus, AOI decision means 110 provides identification of an area or areas of interest (AOI).

Routing means 120, shown separately in FIG. 5 for clarity of presentation, may be part of the AOI decision means 110. Routing means 120, may be a decision process implemented in software (a computer program routine) or, for example, in hardware as an electrical bridge circuit or a discriminator circuit. Reset means 121 is actuated if no AOI has been detected or identified by AOI decision means 110, thereby causing a resetting (memory clear) of all system storage means. If an AOI or AOIs are identified by AOI decision means 110, routing means 120 routes the AOI decison to automatic target detection means 130, which then becomes activated for automatic determination of the target location within each AOI. Upon activation, target detection means 130 recalls from storage means 64 via line 68 the spatially coordinated digital signals of all picture elements (pixels) contained within, or subtended by, the AOI grid cell. A preferred target detection means 130 is a microprocessor implementing in software a thresholding process having a single threshold level which partitions or segments the digital signals of pixels within the AOI into two groupings, namely a first grouping of pixel signals at or below that single threshold level, and a second grouping of pixel signals above that single threshold level. Pixels in the second grouping with signal levels above the threshold level are pixels representative of domains of the target, and pixels in the first grouping with signal levels below said threshold level are pixels representative of the natural environmental background around the target within the AOI. Thus, target detection means 130 functions like any one of the single-threshold processors depicted in the upper section of the texture determination means 70 in FIG. 6. Due to the single threshold level of target detection means 130, the second grouping of pixels having signal levels above the single threshold level will be comprised of pixels having a range of signal levels indicative of the various features of the target. For example, target features made of concrete may be adjacent to features made of steel and adjacent to features made of glass or air such as windows in a target structure. Therefore, a target will appear in the display as a clustered arrangement of sub-regions indicative of different pixel signal levels associated with these features.

A display means 140 with color display capability can display each of the various target features, at least to a rough approximation, in a differently perceived color, where each of the different colors is representative of, for example, an even fraction of the total range of pixel signal levels above the single threshold level of target detection means 130. Likewise, yet another perceived color can be selected for display of the background around the target by selecting that color for pixels contained in the first grouping of pixels having signal levels at or below the threshold. Thus, in instances where visual observation of general outlines or features of a target is beneficial to a human observer, the display means 140 can provide such color display capability.

If display means 140 is a monochrome display, for example, a monochrome video display, various target features would appear on the display as contiguous sub-regions, or clusters, each target sub-region or cluster having a different grey scale or brightness level.

Figure 10:
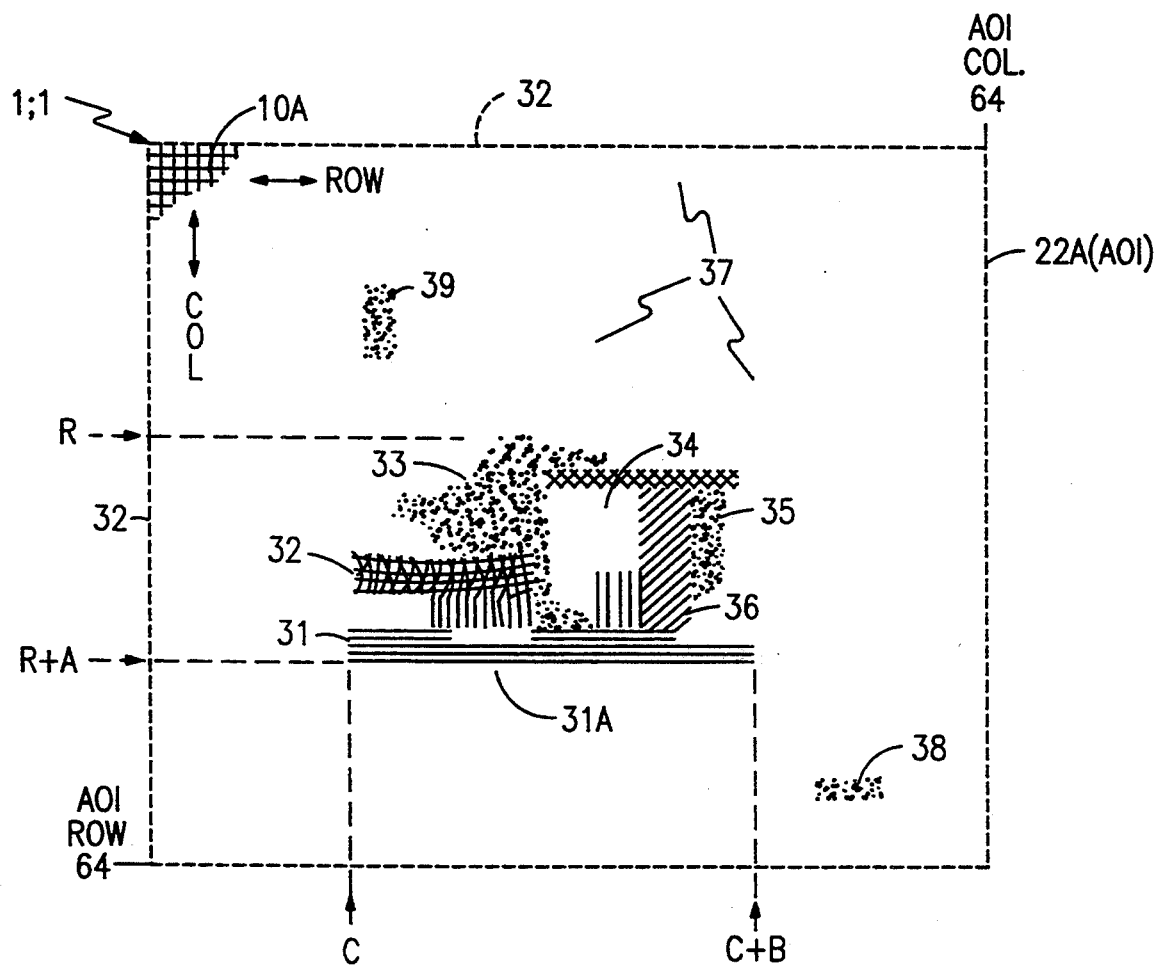
FIG. 10 is a diagram of a display obtained with the system of the invention, which depicts a target and its location coordinates within an area of interest.

FIG. 10 is a grey-scale rendition of a target and its contiguous sub-regions or clusters of pixels within an area of interest (AOI), where various levels of shading are intended to indicate various ranges of signal levels associated with different target features. The natural environmental features surrounding the target are shown as a uniform white background, although an actual display would show a relatively dark and uniform background with relatively lighter target features. FIG. 10 may best be viewed on conjunction with FIG. 1. Area of interest (AOI) 22A, shown in dotted outline, contains in this example a spatially coordinated arrangement of 64×64 picture elements 10A in rows and columns. Target 30A is composed of several contiguous sub-regions 31 through 36, indicative of different signal levels as shown by several different shading patterns. The general target outline is given by spatial coordinates R and R+A parallel to the row direction, and C and C+B parallel to the column direction. The background 37 surrounding the target is depicted as substantially uniform throughout the AOl, with the exception of two small clusters 38, 39 of pixels attributed either to system noise or to very small domains of high textural contrast within the original scene 1 in FIG. 1.

The spatial coordinates of the AOl 22A and of target 30A within it are readily related to the spatial coordinates of the full scene 1 as indicated particularly in FIG. 2.

If a human observer is present to view the display of the target within the AOl grid cell, the observer can record, report or otherwise communicate the location coordinates of the man-made object or target within the AOl grid cell. If the entire automatic target detection system is operated remotely, a reporting means 150 can be used to forward the target location coordinates to an appropriate receiver for further decisions. Reporting means 150 are generally well known in the telecommunications field, and may include telephone, radio, microwave, and satellite communication means suitable for communicating signals indicative of spatial coordinates. Upon completion of the report of the target spatial coordinates, reset means 151 may be activated immediately, or with built-in time delay, or by remote instruction, to reset all storage means and scene sensing means S, if necessary, so as to ready the automatic target detection system for accepting another scene or frame.

Experimental findings using a test model of the automatic target detection system, but having all data storage means in the form of mechanically driven hard magnetic storage means (hard magnetic disks), and the methods in accordance with the present invention have confirmed that in each of thirty-six different test scenes, transferred one scene at a time to storage means 40 of FIG. 5, the elapsed time between release of whole-scene digital signals from storage means 40 to partitioning means 60 and the reporting by visual observation of a target and its location coordinates was about 60 seconds, where a large fraction of that time was due to the relatively long times for storage and read-out of digital signals, associated with magnetic storage in that test model. Electronic storage media (integrated circuits memories) will reduce the total processing time, i.e., the time between storage in storage means 40 and display of the target in display means 140, to about 5 seconds, a close approximation to near real-time automatic target detection.

For all test scenes containing known target locations, the automatic detection system test model rendered correct target location detection at a rate exceeding 95 percent. The test model also rendered at its state of development a false target detection rate of less than about 0.5 false targets per test scene.

From the foregoing detailed description of the preferred embodiments of the invention, it will be apparent that there has been provided improved automatic detection of targets in natural environmental scenes using regional texture measures or indices, self-calibration of composite regional texture measures and processes (AOI tests) to identify an area of interest within a scene and subsequent self-detection of a target within the area of interest. Variations and modifications of the herein described methods and system, and other applications of self-calibration and self-detection features within the scope of the invention, will undoubtedly suggest themselves to those skilled in the art. For example, machine vision systems used in conjunction with robotic devices in industrial, commercial or environmental fields may advantageously incorporate self-calibration and self-detection of texture measures to distinguish between textural features of objects or their scene likeness. Accordingly, the foregoing description is to be taken as illustrative and not in a limiting sense.

I claim:

1. A method for texture-based automatic detection of targets comprising the steps of:
    sensing a natural environment scene;
    digitizing the sensed scene into a first plurality of spatially coordinated picture elements (pixels) with associated digital signals;
    storing the spatially coordinated digital signals;
    partitioning the first plurality of spatially coordinated pixels into a second plurality of spatially overlapping groups of pixels arranged spatially sequentially in orthogonal rows and columns with an identical fraction of pixels of the first plurality of pixels in each group of pixels, said spatially sequentially arranged groups having a sequential arrangement extending along successive straight paths across the scene;
    storing the digital signals associated with the partitioned groups of pixels;
    determining simultaneously a plurality of texture measure values and a composite texture measure value from the digital signals associated with each partitioned spatially coordinated group of pixels;
    storing the spatially coordinated composite texture measure values of the groups of pixels; and
    identifying said target in the scene from said texture measure values, and wherein said identifying step includes the steps of:
    self calibrating the composite texture measure values of the stored spatially coordinated groups of pixels along both the rows and the columns;
    storing the spatially coordinated self-calibrated composite texture measure values;
    deciding the identity of an area or areas of interest (AOI) as the spatially coordinated group or groups of pixels most likely to contain a target;
    routing the AOI identity decision obtained in said deciding step;
    detecting automatically the presence of a target within the AOI or AOIs;
    displaying the spatial location coordinates of the target within the AOI or AOIs;
    reporting the spatial location coordinates of the target or targets; and
    resetting the automatic detection system for acceptance of a subsequent representation of a sensed scene.

2. The method according to claim 1, wherein said partitioning step comprises: selecting at least ten of the second plurality of spatially overlapping groups of pixels arranged spatially sequentially across the scene with each group of pixels having an identical fraction of pixels of the first plurality of spatially coordinated pixels.

3. The method according to claim 1, wherein said determining step comprises:
    establishing simultaneously for each group of pixels at a time a third plurality of numbers $n_a$, $n_b$, $n_c$, through $n_{i+1}$ of segmented sub-regions of pixels at each of a fourth plurality of temporally simultaneous threshold levels with incremental increases $V_i$, where i is a plurality of successive integers, for the digital signals associated with the pixels in each group;
    forming a fifth plurality of texture measure values $R_1$, $R_2$, through $R_i$ simultaneously for each group of pixels at a time in accordance with the following relationships, $$R_1 = \frac{n_a\, n_b}{|n_a - n_b|}\,;\, R_2 = \frac{n_b\, n_c}{|n_b - n_c|}\,;\, \text{through}$$

$$R_i = \frac{n_i\, n_{i+1}}{|n_i - n_{i+1}|}\,;\, \text{and}$$

generating a composite texture measure value G as the linear sum of texture measure values $R_1$, $R_2$, through $R_i$ for each group of pixels at a time.

4. The method according to claim 1, wherein said self-calibrating step comprises:
    designating the composite texture measure value $G_{1r}$ of a first group in the spatial sequence of groups of pixels in each row r as a ratio $G_{1r}/G_{1r}=1.00$;
    deriving self-calibrated composite texture measure values for each successive neighboring group of pixels in each row r of groups by the ratio of composite texture measure values between the successive neighboring group and the preceding group in that row;
    designating the composite texture measure value $G_{1c}$ of a first group in the spatial sequence of groups of pixels in each column c as a ratio $G_{1c}/G_{1c}=1.00$; and
    deriving self-calibrated composite texture measure values for each successive neighboring group of pixels in each column c of groups of pixels by the ratio of composite texture measure values between the successive neighboring group and the preceding group in that column.

5. The method according to claim 1, wherein said deciding step comprises:
   subjecting the row and column spatially coordinated self-calibrated composite texture measure values to a group of statistical tests to identify an AOI or AOIs.

6. The method according to claim 5, wherein said detecting step comprises:
   retrieving digital signals associated with partitioned AOI groups of pixels stored in said partitioned pixel group storing step;
   choosing a single threshold level; and
   separating the spatially coordinated AOI digital signals retrieved in said retrieving step into a first group of AOI pixel signals at or below said single threshold level and into a second group of substantially target pixel signals above said single threshold level.

7. The method according to claim 6, wherein said displaying step comprises:
   rendering the spatial extent of the target within the AOI as a clustered arrangement of different visually perceived colors indicative of different ranges of target pixel signals in the second group of pixels separated in said separating step; and
   showing the spatial extent of the first group of pixels separated in said separating step in yet another perceived color.

8. The method according to claim 2, wherein said selecting step further comprises:
   arranging each of said second plurality of spatially coordinated groups of pixels in a format; and
   deploying an overlap of between one percent and fifty percent of the number of pixels spatially associated with the format arranged in said arranging step among neighboring groups of pixels of said second plurality of spatially sequentially arranged coordinated groups of pixels.

9. The method according to claim 3, wherein each of said establishing and forming and generating steps further comprises:
   determining said texture measure values and composite texture measure values within the incrementally increasing range of threshold levels $V_i$, where $i \leq 20$.

10. The method according to claim 3, wherein said establishing step further comprises:
    setting the incremental increase of threshold levels from $V_i$ as a linear incremental increase.

11. The method according to claim 4, wherein each of said deriving steps further comprises:
    electing second-neighbor groups of pixels in the rows and columns of groups of pixels for derivation of the self-calibrated composite texture measure values.

12. The method according to claim 5, wherein said subjecting step further comprises:
    applying tests selected from the group consisting of a rank order test of self-calibrated composite texture measure values; a linear correlation test between ranked values and neighboring unranked values in row and column directions; and a sum-of-squares slope difference test between ranked values and unranked values in row and column directions.

13. A system for texture-based automatic detection of targets comprising:
    means for sensing a natural environment scene;
    means for digitizing the sensed scene into a first plurality of spatially coordinated picture elements (pixels) with associated digital signals;
    means for storing the spatially coordinated digital signals;
    means for partitioning the first plurality of spatially coordinated pixels into a second plurality of overlapping groups of pixels arranged spatially sequentially in rows and orthogonal columns with an identical fraction of pixels of the first plurality of pixels in each group of pixels, said spatially sequentially arranged groups having a sequential arrangement extending along successive straight paths across the scene;
    means for storing the digital signals associated with the partitioned groups of pixels;
    means for determining simultaneously a plurality of texture measure values and a composite texture measure value from the digital signals associated with each partitioned spatially coordinated group of pixels;
    means for storing the spatially coordinated composite texture measure values of the groups of pixels; and
    means for identifying said target in the scene from said texture measure values, and further comprising:
    means for self calibrating the composite texture measure values of the stored spatially coordinated groups of pixels along both the rows and the columns;
    means for storing the spatially coordinated self-calibrated composite texture measure values;
    means for deciding the identity of an area or areas of interest (AOI) as the spatially coordinated group or groups of pixels most likely to contain a target;
    means for routing the AOI identity decision obtained by said deciding means;
    means for detecting automatically the presence of a target within the AOI or AOIs;
    means for displaying the spatial location coordinates of the target within the AOI or AOIs;
    means for reporting the spatial location coordinates of the target or targets; and
    means for resetting the automatic detection system for acceptance of a subsequent representation of a sensed scene.

14. The system according to claim 13, wherein said partitioning means comprises:
    means for selecting at least ten of the second plurality of spatially overlapping groups of pixels arranged spatially sequentially across the scene with each group of pixels having an identical fraction of pixels of the first plurality of spatially coordinated pixels.

15. The system according to claim 13, wherein said determining means comprises:
    means for establishing simultaneously for each group of pixels at a time a third plurality of numbers $n_a$, $n_b$, $n_c$, through $n_{i+1}$ of segmented sub-regions of pixels at each of a fourth plurality of temporally simultaneous threshold levels with incremental increase $V_i$, where i are successive integers, for the digital signals associated with the pixels in each group;
    means for forming a fifth plurality of texture measure values $R_1$, $R_2$, through $R_i$ simultaneously for each group of pixels at a time in accordance with the following relationships, $$R_1 = \frac{n_a\, n_b}{|n_a - n_b|}\, ;\; R_2 = \frac{n_b\, n_c}{|n_b - n_c|}\, ;\, \text{through}$$

$$R_i = \frac{n_i\, n_{i+1}}{|n_i - n_{i+1}|}\, ;\, \text{and}$$

means for generating a composite texture measure value G as the linear sum of texture measure values $R_1$, $R_2$, through $R_i$ for each group of pixels at a time.

16. The system according to claim 13, wherein said self-calibrating means comprises:

means for designating the composite texture measure value $G_{1r}$ of a first group in the spatial sequence of groups of pixels in each row r as a ratio $G_{1r}/G_{1r}=1.00$;

means for deriving self-calibrated composite texture measure values for each successive neighboring group of pixels in each row r of groups of pixels by the ratio of composite texture measure values between the successive neighboring group and the preceding group in that row;

means for designating the composite texture measure value $G_{1c}$ of a first group in the spatial sequence of groups of pixels in each column c as a ratio $G_{1c}/G_{1c}=1.00$; and means for deriving self-calibrated composite texture measure values for each successive neighboring group of pixels in each column c of groups of pixels by the ratio of composite texture measure values between the successive neighboring group and the preceding group in that column.

17. The system according to claim 13, wherein said deciding means comprises: means for subjecting the row and column spatially coordinated self-calibrated composite texture measure values to a group of statistical tests to identify an AOI or AOIs.

18. The system according to claim 17, wherein said detecting means comprises:

means for retrieving digital signals associated with partitioned AOI groups of pixels stored in said partitioned pixel storage means;

means for choosing a single threshold level; and means for separating the spatially coordinated AOI digital signals retrieved by said retrieving means into a first group of AOI pixel signals at or below said single threshold level and into a second group of substantially target pixel signals above said single threshold level.

19. The system according to claim 18, wherein said displaying means comprises:

means for rendering the spatial extent of the target within the AOI as a clustered arrangement of different visually perceived colors indicative of different ranges of target pixel signals in the second group of pixels separated by said separating means; and means for showing the spatial extent of the first group of pixels separated by that separating means in yet another perceived color.

20. The system according to claim 15, wherein said:

means for establishing includes means for establishing up to twenty temporally simultaneous threshold levels which incrementally increase by one.

21. The system according to claim 16, wherein said means for deriving includes means for deriving the row and column self-calibrated composite texture measure values by the ratio between each second-neighbor successive group and each second-neighbor preceding group.

22. The system according to claim 13, wherein said storing means comprises:

means for electronic storing of digital data; and means for resetting said electronic storing means; and said reporting and resetting means further comprises: means for remote non-verbal communication.

23. The system according to claim 17, wherein said subjecting means comprises:

means for applying tests selected from the group consisting of a rank order test of self-calibrated composite texture measures; a linear correlation test between ranked values and neighboring unranked values in row and column directions; and a sum-of-squares slope difference test between ranked values and unranked values in row and column directions.

* * * * *